United States Patent [19]

Chung

[11] 4,259,364
[45] Mar. 31, 1981

[54] METHOD FOR FLAVOR IMPROVEMENT OF SOY PROTEIN

[75] Inventor: Koo H. Chung, Granger, Ind.

[73] Assignee: Miles Laboratories, Inc., Elkhart, Ind.

[21] Appl. No.: 121,667

[22] Filed: Feb. 15, 1980

[51] Int. Cl.$^3$ ............................................. A23J 3/00
[52] U.S. Cl. .................................. 426/656; 426/431; 426/802
[58] Field of Search ............... 426/539, 634, 656, 431, 426/802, 261

[56] References Cited

U.S. PATENT DOCUMENTS

| | | | |
|---|---|---|---|
| 3,177,079 | 4/1965 | Kuramoto et al. ............... | 426/802 X |
| 3,361,574 | 1/1968 | Paulsen ................................. | 426/634 |
| 3,361,575 | 1/1968 | Paulsen ................................. | 426/634 |
| 3,420,811 | 1/1969 | Van Wieren et al. ........... | 426/656 X |
| 4,137,339 | 1/1979 | Kudo et al. ........................... | 426/634 |
| 4,154,726 | 5/1979 | Kajinami ........................... | 426/656 X |

*Primary Examiner*—Robert A. Yoncoskie
*Attorney, Agent, or Firm*—Jerome L. Jeffers

[57] ABSTRACT

Disclosed is a method for improving the flavor quality of textured soy protein which involves treating the soy protein with an aqueous solution of a bromate or iodate salt to oxidize the soy flavor precursors present in the soy protein being treated and inhibit them from interacting with other organic components in the soy protein in the course of thermal processing. After bromate or iodate treatment, the treated soy protein is rinsed with water to remove oxidized flavor precursors and any residual salt. The treated product is bland and generates little reversion flavor even after retorting.

9 Claims, No Drawings

METHOD FOR FLAVOR IMPROVEMENT OF SOY PROTEIN

BACKGROUND OF THE INVENTION

Several soy protein products are available commercially for use in foods. However, the greatest obstacle to greater use of soy products in food for human consumption is their undesirable flavor. When soy products are used as food ingredients they release bound flavors upon thermal processing and also generate reactants that may produce flavors. The problem may be compounded if those off flavors are carried through the manufacturing process and trapped in the finished product. The off flavor problem has been difficult to solve because of the low concentration of flavor forming precursors in the soy protein and their complicated interactions. Soy flavor development is believed to be mainly related to an enzymatic oxidation reaction of the polyunsaturated fatty acids with the lipoxygenase and peroxidase contained in soy. Soluble sugars in soybeans are also considered to be associated with flavor formation when subjected to thermal processing.

Although many of the undesirable soy flavors have been identified and can be extracted with organic solvents, such as a hexane-ethanol azeotrope and hot 95% ethanol, these treatments increase production costs and impair protein functionality while providing only marginal flavor improvement. Furthermore, the reversion flavor development of textured soy protein during thermal processing is a serious problem which has not been resolved in the area of human food application. Accordingly, it would be desirable and it is an object of the present invention to provide an improved method for the removal of undesirable flavors from textured soy protein to thereby render it more palatable to human consumers.

SUMMARY OF THE INVENTION

The present invention involves a method of treating textured soy protein to thereby improve the flavor thereof which method comprises the steps of:

(a) treating the soy protein with an aqueous solution of a nontoxic bromate or iodate salt containing from about 15 to about 200 parts per million iodate ion, based on the weight of the soy protein containing 80% water after leaching, for a time and at a temperature sufficient to oxidize soy flavor precursors in the soy protein being treated, and (b) removing the treated soy protein from contact with the iodate solution.

DETAILED DESCRIPTION AND PREFERRED EMBODIMENTS

The term "textured soy protein" as used herein is intended to mean that the material has texture imparted by a thermoplastic extrusion process so that disintegration of the physical form will not occur during the water leaching and retorting process to which the material is subjected during its processing. Typically this material is prepared by extruding soy flours under conditions of high temperature and pressure generated from the extruder.

The textured soy protein is leached with water to remove carbohydrates and the leached soy protein chunks are heated with an aqueous solution of a nontoxic bromate or iodate salt. Typically, the weight ratio of wet soy chunks to salt solution is about 1 to 2 although this is by no means critical to the operability of the invention. The salt cation can be any positive ion which forms a water soluble salt and is nontoxic and therefore suitable for use in food products. Typically the calcium, potassium and sodium salts can be used with potassium iodate being preferred. The hydrogen salt, e.g., iodic acid, may also be used. The concentration of iodate is such that there is present in solution about 15 to about 200 parts per million iodate ion based on the weight of leached soy protein containing 80% water by weight. Preferably, the concentration of iodate is in the range of from 35 to 70 parts per million iodate ion.

The time required for the soy protein to be in contact with the iodate salt solution will be inversely proportional to the temperature provided the temperature is high enough to effectively oxidize the soy flavor precursors. Typically, the temperature is held at a range of from 65° C. up to the boiling point of the solution to minimize reaction times. At temperatures in this range, the oxidation of soy flavor precursors can be accomplished in a period of from about 5 to 30 minutes. It is preferred to heat the solution to a temperature of at least 85° C. for a period of from 15 to 30 minutes.

The mechanism by which the bromate or iodate oxidation suppresses flavor formation is not understood. Other oxidizing agents, such as $H_2O_2$, $KClO_4$, $NaHSO_3$, $K_2S_2O_8$, $NaClO_3$ and $HClO_4$ have been tested but do not produce as desirable a result as observed with the use of iodate as the oxidizing agent.

After removing the treated soy protein from contact with the salt solution, the treated material is preferably rinsed with water to remove the oxidized soy flavor precursors and any residual bromate or iodate salt. The above described treatment has been found to significantly reduce the formation of off flavors during food processing and especially in the case of retorting the finished soy protein products.

If the leached soy protein is canned directly with the iodate salt in either dry or water pack without reacting with heat and is retorted at 116° C. for 90 minutes, it has been found during a six month product shelf life test objectionable metallic or medicine like flavors can develop and it is difficult to provide a reproducible product with desirable flavor. Heat treating the soy protein with the salt solution and removing the protein from contact with the solution before canning is, therefore, the most effective way of producing a uniform and bland soy product.

The method of practicing the present invention is further illustrated by the following example:

EXAMPLE I

A water leached textured soy protein sample (500 g) (100 g soy protein and 400 g water) was heated with stirring at 85° C. for 30 minutes in a Groen kettle containing 1000 ml of 35 ppm (based on the weight of the textured soy protein sample) $KIO_3$ solution. After heating, the iodate solution was drained and the soy protein was washed twice with water at room temperature. At this point, 200 g of the iodate treated material was canned with 200 ml of water, and the can was retorted at 116° C. for 90 minutes.

The canned product was found to have little residual beany or cooked soy flavor and the solution in the can was found to be clearer than that in a control can containing untreated soy protein.

What is claimed is:

1. A method of treating textured soy protein to thereby improve the flavor thereof which method comprises the steps of:
   (a) treating the soy protein with an aqueous solution of a nontoxic bromate or iodate salt containing from about 15 to about 200 parts per million bromate or iodate ion, based on the weight of the soy protein containing 80% water after leaching, for a time and at a temperature sufficient to oxidize soy flavor precursors in the soy protein being treated; and
   (b) removing the treated soy protein from contact with the salt solution.

2. The method of claim 1 whereupon the treated soy protein is rinsed with water after removing it from contact with the salt solution.

3. The method of claim 1 wherein the weight ratio of textured soy protein to salt solution is about 1 to 2.

4. The method of claim 1 wherein the iodate salt concentration is from 35 to 75 parts per million.

5. The method of claim 1 wherein the textured soy protein in contact with the salt solution is heated to a temperature of from 65° to the boiling point of the solution for a period of from 5 to 30 minutes.

6. The method of claim 1 wherein the textured soy protein in contact with the salt solution is heated to a temperature of from 85° C. to the boiling point of the solution for a period of from 15 to 30 minutes.

7. The method of claim 1 wherein the salt is calcium, sodium or potassium bromate or iodate.

8. The method of claim 1 wherein the iodate ion is introduced to the solution in the form of iodic acid.

9. A method of treating soy protein to thereby improve the flavor thereof which method comprises the steps of:
   (a) treating the soy protein with an aqueous solution of potassium iodate containing from 35 to 70 parts per million iodate ion, based on the weight of the soy protein containing 80% water after leaching, at a temperature of from 85° C. to the boiling point of the solution for a period of from 15 to 30 minutes;
   (b) removing the treated soy protein from contact with the iodate solution; and
   (c) washing the treated soy protein.

* * * * *